United States Patent
Prabhu et al.

(10) Patent No.: US 7,198,844 B2
(45) Date of Patent: Apr. 3, 2007

(54) MICROPOROUS POLYMERIC RESIN CONTAINING STABILIZERS AND METHOD FOR MAKING THEREOF

(75) Inventors: Vaikunth S. Prabhu, Morgantown, WV (US); Marshall D. Moore, Morgantown, WV (US)

(73) Assignee: Crompton Corporation, Middlebury, CT (US)

( * ) Notice: Subject to any disclaimer, the term of this patent is extended or adjusted under 35 U.S.C. 154(b) by 584 days.

(21) Appl. No.: 10/347,037

(22) Filed: Jan. 17, 2003

(65) Prior Publication Data

US 2004/0142170 A1    Jul. 22, 2004

(51) Int. Cl.
*C08J 9/22*    (2006.01)

(52) U.S. Cl. ......................... 428/402; 521/56; 521/143; 521/149; 524/115; 524/186; 524/359; 524/394

(58) Field of Classification Search ................ 424/489; 428/402; 521/56, 143, 149, 163; 524/115, 524/186, 359, 394
See application file for complete search history.

(56) References Cited

U.S. PATENT DOCUMENTS

| 3,644,278 A | 2/1972 | Klemchuk | 524/100 |
| 3,778,464 A | 12/1973 | Klemchuk | 560/171 |
| 4,247,498 A | 1/1981 | Castro | 264/41 |
| 4,590,231 A | 5/1986 | Seltzer et al. | 524/100 |
| 4,645,664 A | 2/1987 | Lange | 514/772.7 |
| 5,866,718 A | 2/1999 | Prabbu | 564/298 |
| 5,955,633 A | 9/1999 | Prabbu | 564/298 |
| 6,294,505 B1 | 9/2001 | Luers et al. | 508/136 |

FOREIGN PATENT DOCUMENTS

EP    138 203    12/1988

*Primary Examiner*—Allan R. Kuhns
(74) *Attorney, Agent, or Firm*—Daniel Reitenbach

(57) ABSTRACT

Microporous particles for stabilizing thermoplastic compositions comprising comprising a stabilizer are provided. Each of the porous microparticles has a plurality of preformed pores into which the stabilizing agent is loaded and from which the stabilizing is subsequently released to the processing environment of use.

18 Claims, No Drawings

MICROPOROUS POLYMERIC RESIN CONTAINING STABILIZERS AND METHOD FOR MAKING THEREOF

FIELD OF THE INVENTION

The invention relates generally to a microporous resin composition comprising additives, processes for its preparation and its use.

BACKGROUND

Use of polymeric additives such as amine oxides as an antioxidant or phosphites is known in the polymer industry. For example, phosphites (commercially available in liquid and solid forms) are antioxidants used to improve color, processing, heat and UV stability in a wide array of polymers, including polyolefins, ABS, synthetic rubber, PVC and more; amine oxides are hydrolytically stable high performance melt process stabilizers, for use in proprolyene, styrenics, and other polyolefins. The liquid additive has certain drawbacks, e.g., the handling of the liquid itself as well as its limited applications because certain applications or set-up cannot accommodate liquid stabilizers and can only handle solid materials. With respect to additives in the solid form, the handling of additives in a powder/dust form can sometimes be problematic. Therefore, it is preferred that low-dusting and easily feedable solid additives are used.

It is known in the art to incorporate certain additives into certain "carriers." EP 138 203 discloses the mixing of certain additives, slip agent, with silica gel. However, the resulting product is not necessarily a free-flowing material that lends itself to convenient processing. U.S. Pat. No. 6,294,505 discloses the incorporation of additives including slip agents, antioxidants, light stabilizers, flame-retardant agents, etc. into anti-blocking agents such as silica gels, for a free-flowing powder which does not agglutinate and can be incorporated into polyolefins for processing and producing polyolefin films.

U.S. Pat. No. 4,247,498 discloses "carriers" as microporous polymers in various forms and shapes as films, blocks, and intricate shapes. The reference also discloses the preparation of microporous materials by heating a thermally stable liquid with a polymer and cooling to certain temperature, in which thermaodynamic non-equilibrium liquid-liquid phase separation is initiated. It should be noted that the material to be used herein should be thermally stable at the condition of operations.

Applicants have surprisingly found an inexpensive and convenient approach to deliver additives in the form of stabilizers, such as amine oxides and phosphites to meet the polymer processing needs, with the end results being comparable or better than in the prior art additives in a liquid or solid powder/pellet form.

SUMMARY OF THE INVENTION

The invention relates to a polymeric microporous particle for improving melt stability and color stability of thermoplastic composition, wherein the microporous particle having a plurality of preformed pores into which a stabilizer such as an amine oxide or an organic phosphite is loaded and from which the stabilizer is released to the thermoplastic composition in processing.

The invention further relates to a method for stabilizing thermoplastic compositions, comprising mixing into the thermoplastic composition microporous particles imbibed with a stabilizer such as an amine oxide or an organic phosphite.

Finally, the invention relates to a method for preparing polymeric microporous particles for stabilizing thermoplastic compositions, comprising the steps of combining the polymeric microporous particles containing a substantially continuous network of pores open to the exterior of said particles with a stabilizer composition comprising at least one of an amine oxide and an organic phosphite to form a suspension, and recovering the microporous particles saturated with the stabilizer for subsequent use in stabilizing thermoplastic compositions.

DESCRIPTION OF THE INVENTION

An important feature of this invention is the use of preformed porous microparticles or fibers for the delivery of the additives, starting with the use of preformed porous microparticles or fibers, and adding the additives in a separate step.

Additive Delivery Means. The delivery means may be made of a variety of materials. In one embodiment, the delivery polymer material is chemically inert with respect to the additive which is retained by the polymer material. The additive, when incorporated into the delivery means, is trapped or imbibed onto the polymer material of the delivery means.

In one embodiment of the invention, the delivery means is in the form of a microporous polymer, e.g., polyesters, polyamides, polyanhydrides, polyacrylates, or polyalkenes such as polyethylene or polypropylene. If a material has interconnecting pores or holes that are small enough, e.g., less than 100 micrometers, the material is said to be microporous. The microporous materials can be defined as a microparticle, having collection of holes or cells surrounded by a solid outer material, typically referred to as the matrix. The microparticles, which may assume a variety of shapes, generally have diameters of from about 5 to 1000 microns, in one embodiment of 20–500 microns, and are extensively permeated with a network of pores into which the additives of the present invention is introduced.

In one embodiment, the microparticles (or alternatively, "microcapsules" or "microporous particles" or "microporous polymer granulate") are structures of essentially spherical, interconnected void spaces, with void volumes ranging from about 20 to 90%. In another embodiment, the void volumes are 30 to 80%. In a third embodiment, from about 50 to 80%. Typical pores have a median size of about 0.10 micrometers to about 10 micrometers, with the cell size ranging up to about 30 micrometers, with no particular distribution of shape or size required. Pore size of the delivery means will influence transport properties of the additives to be delivered or mixed with the end-use polymers, i.e., ABS, polyolefin, etc.

In one embodiment, the delivery means is in the form of a microporous polymer granulate sold under the trade name of Accurel® MP from Mebrana GmbH, polymer products made from thermoplastic resins such as polypropylene, linear low density polyethylene, low density polyethylene, high density polyethylene, and polyamide, with loading capacity (i.e., void volume) of up to 80%. The microparticles Accurel MP are microspheres having diameters of about 100 to 300 microns, void volumes of 50 to 80%, pore sizes of 0.1 to 1 micron, and a loading capacity of up to 70% by weight.

The preparation of these materials is described in U.S. Pat. No. 4,645,664, issued Feb. 24, 1987, incorporated herein by reference.

In yet another embodiment of the present invention, the delivery means is in the form of microporous fiber also available under the name Accurel®.

Additives for Incorporation into Microparticles. The additives for incorporation into the microparticles, microspheres, or microcapsules of the present invention include organic components such as hydrocarbon amine oxides, phosphites, hindered phenolics, hindered amines, and mixtures thereof.

In one embodiment, the additive is a hydrocarbon amine oxide. In another embodiment, the additive is a tertiary amine oxide of the general formula (I)

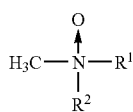

wherein $R^1$ and $R^2$ are each independently a $C_{8-30}$ alkyl moiety. In another embodiment, the $R^1$ and $R^2$ of formula (I) are each independently a $C_{16-18}$ alkyl moiety; and wherein the amine oxide picks up less than about 10% by weight water when stored at 23° C. and 80% relative humidity, and is a solid at 23° C. In yet another embodiment, the $R^1$ and $R^2$ are each independently a $C_{10}$ alkyl moiety; and wherein the amine oxide has a 10% weight loss rating of at least about 120° C., when measured at a heating rate of 20° C./minute. In yet another embodiment, the $R^1$ and $R^2$ are each independently a $C_{16-18}$ alkyl moiety; and wherein the amine oxide has a 10% weight loss rating of at least about 145° C., when measured at a heating rate of 20° C./minute.

In another embodiment of the invention, the additive is a hydroxylamines. Examples include, but are not limited to, N,N-dethylhydroxylamine, N,N-di-benzylhydroxylamine, N,N-di-octylhydroxylamine, N,N-di-laurylhydroxylamine, N,N-tetradecylhydroxylamine, N,N-di-hexadecylhydroxylamine, N,N-di-octadecylhydroxylamine, N-hexadecyl-N-octadecylhydroxylamine, N-heptadecyl-N-octadecylhydroxylamine, N,N-di-tert-butylhydroxyalmine, N-cyclohexylhydroxylamine, N-cyclododecylhydroxylamine, N,N-dicyclohexylhydroxylamine, N,N-di(coco-alkyl)hydroxylamine, and N,N-dialkylhydroxylamine derived from hydrogenated tallow amine (i.e., N,N-di(tallow alkyl)hydroxylamine), as well as mixtures containing any of the foregoing. Other useful hydroxylamines are known in the art as those disclosed in U.S. Pat. Nos. 3,644,278; 3,778,464; and 4,590,231.

Amine oxides are generally made by the oxidation of the corresponding amine with hydrogen peroxide. Synthesis of the hydrocarbon amine oxide for use as the additive of the present invention is known in the art, see U.S. Pat. Nos. 5,866,718, 5,955,633 and references quoted therein.

In a second embodiment of the invention, the additive is a phosphite. Examples include triphenyl phosphite, diphenylalkyl phosphites, phenyl dialkyl phosphites, tri-(nonylphenyl)phosphite, trilauryl phosphite, trioctadecyl phosphite, di(isodecyloxy)-2,4,8,10-tetraoxa-3,9-diphospha{5,5]-undecane, and tri-(4-hydroxy-3,5-di-tert-butylphenyl) phosphite, and/or similar phosphonites. An example is a Weston® phosphite product available from GE Specialty Chemicals, Inc.

The organic phosphite can be any organic phosphite having the formula $(RA)_3—P$, in which A can be oxygen or sulfur or a mixture of the same, and R is aryl, alkyl, cycloalkyl, aralkyl or aralkaryl in any combination. Organic phosphites have been widely used as stabilizers for polyolefins and similar polymeric materials. Many different types of phosphites have been proposed, including organic phosphite-phenol transesterification products, the preferred phenol being a bis-phenol; tris-(alkaryl)phosphite esters; bis-(2,4-di-tertiary-butyl-phenyl) cyclohexyl phosphite and 2,4-di-(tertiary butyl)phenyl dicyclohexyl phosphite; di-n-butyl (2-t-butyl-cresyl)phosphite, di-n-hexyl(2-t-butyl-m-cresyl)phosphite, di-n-hexyl(2-t-butyl-p-cresyl)phosphite, di-n-octyl(2-t-butyl-p-cresyl)phosphite, di-n-butyl-(3,4-di-t-butyl-phenyl)phosphite, di-n-butyl-(2,6-di-t-butyl-p-cresyl) phosphite, di-phenyl (2-t-butyl-p-cresyl)phosphite, tri-(2-t-butyl-p-cresyl)phosphite, di-(ethylthioethyl)-(2-t-butyl-p-cresyl)phosphite, di(octylthioethyl) (2-t-butyl-p-cresyl) phosphite, tris-(p-nonylphenyl) phosphite, di-(2,4-di-tert-butylphenyl)-2-butyl-2-ethyl-1,3-propanediol phosphite, (2,4,6-tri-tert-butylphenyl)-2-buty-2-ethyl -1,3-propanediol phoshite, and bis-[(2,4-di-tert-butyl, 6-methyl)phenyl] ethyl phosphite.

In one embodiment of the invention, the phoshites are sterically hindered organic phosphites, e.g., phosphites containing 2,4,6-substituted phenyl groups wherein the substitution is selected from the group consisting of t-butyl, t-amyl, t-hexyl, cyclohexyl, t-pentyl, and t-octyl.

These phosphites are readily prepared by conventional procedures. For example, reacting the corresponding alcohol with an organophosphite, such as by transesterification. In one embodiment, the corresponding 2,6-di-t-butyl-4-methyl or ethyl phenol can be reacted with phosphorus trichloride or a triphosphite such as trimethyl phosphite or triphenyl phosphite, pentaerythritol, and $R_2OH$ in the presence of a base, such as an amine catalyst, to form the phosphite.

Process for Incorporating Additives into Microparticles. In one embodiment of the invention, the active agent or additive is imbibed onto, or induced to migrate into the pores or holes of the microparticles in the process of making the additives themselves. For example, in the process of making amine oxide by the oxidation of the corresponding amine with hydrogen oxide, the microparticles are added directly to the reaction mixture and then solvent can be subsequently stripped off. In one example, the microparticles are added directly to hydroxylamines in an alcohol solvent such as methanol, ethanol, isopropyl alcohol, or a chlorinated solvent such as $CH_2Cl_2$, $CHCl_3$, $CCl_4$, and the solvent is subsequently removed under vacuum.

In a second embodiment, the additives are induced to migrate into the microparticles by simply equilibrating the microparticles in a solution or suspension having the desired concentration of the additive. Suitably, the additive may migrate into the microparticles over a period of about 15 min to about 3 hours.

In an alternate embodiment, a more aggressive technique, such as the application of pressure or vacuum, may be employed to accelerate the migration of the additives into the microparticles.

After adding the additives of the present invention, the microparticles may be dried in air, under vacuum, by controlled evaporative drying, by a flowing inert gas, by freeze drying, or by such other techniques as will be apparent to the skilled artisan. The additive concentration in the microparticles is from about 0.0001 to about 5 weight percent. In a second embodiment, from about 0.001 to about 5 weight percent. In a third embodiment, from about 0.001 weight percent to about 2.0 weight. It should also be noted that more than one type of additives can be incorporated into the microparticles of the present invention.

In one embodiment of the invention, the additive concentration in the microparticles is increased to a level of about 10 to 85 wt. % of the total weight of the microparticles, for the composition to be used as a masterbatch.

As used herein, the term masterbatch is defined as a blend of one or more ingredients (i.e., the amine oxide or phosphite additives with the microporous particles) in the proper proportion by weight with a polymer or mixture of polymers, wherein the total formulation is ultimately added to a second polymer, which is either the same or different than the polymer or mixture of polymers which comprise the masterbatch, as the means of incorporating the microparticle additives into the second polymer.

Administration of the Additives of the Present Invention

The microparticles imbibed or saturated with the additives of the invention are in the form of free-flowing solid particles that can be used in the applications employing thermoplastics such as polyolefin polymers, styrenic polymers, ABS, polyolefin, polyester, and other similar thermoplastics.

Examples of polyolefin polymers include 1-olefin homopolymers such as polyethylene, polypropylene, polybutene, and copolymers of ethylene and/or propylene with one or more higher 1-olefins and/or diolefinic monomers. Polystyrene, whether rubber modified or not, and copolymers of two or more styrenic monomers such as styrene, alpha-methylstyrene, vinylnaphthalene, homopolymers of ring alkyl-substituted vinylaromatic monomers such as individual or mixed ar-methylstyrene isomers, individual or mixed ar-ethylstyrene isomers, individual or mixed ar-methyl isomers of alpha-methylstyrene, and copolymers of two or more such vinylaromatic monomers serve as examples of styrenic polymers that can used as well.

Conventional additives, such as flame retardant synergists, antioxidants, UV stabilizers, dyes, pigments, impact modifiers, fillers, acid scavengers, plasticizers, flow aids, neutralizers, blowing agents, and the like, can be included with the formulations as is appropriate. In one embodiment, other stabilizers/additives are added in an amount of about 10–5000 ppm. In a second embodiment, the stabilizers/additives are selected from the group consisting of phenolic antioxidants, 3-arylbenzofuranones, hindered amine light stabilizers, ultraviolet light absorbers, alkaline metal salts of fatty acids, and hydroxylamines as thiosynergists.

The amount/dosage of the integrated additive/microparticles in processing application and the selection of the appropriate additives as well as the microparticles as the delivery means will be affected by the contemplated processing applications, end-use thermoplastics, the amount of the active additive the microparticles, the process itself (extrusion, injection molding, blow molding, co-extrusion, thermoforming, or other process), the process conditions, among other factors. In one embodiment, the integrated amine oxide additive/microparticle composition is added to the resin formulation in an amount of about 1–10,000 ppm before extrusion or processing of polymer resin.

Various known procedures can be used to prepare the blends or formulations constituting the polymeric microporous particles of this invention. For example the thermoplastic polymer, such as a polyolefin, and the microporous particles and any other components or ingredients to be incorporated into the finished blend can be blended together and thereafter molded by extrusion, compression, or injection molding. Likewise, the components can be mixed together in a Banbury mixer, a Brabender mixer, a roll mill, a kneader, or other similar mixing device, and then formed into the desired form or configuration such as by extrusion followed by comminution into granules or pellets, or by other known methods.

EXAMPLES

Examples are provided herein to illustrate the invention but are not intended to limit the scope of the invention. Examples A-F illustrate how to make the microparticles incorporating the additives of the present invention. Examples 1–16 compare compositions incorporating the stabilizing additives of the present invention with the stabilizing additives in the prior art.

Example A

To 25.0 g of hydrated N,N-Didecyl-N-methylamine oxide in liquid form in a 500 mL. round bottom flask is added 25.0 g of Accurel MP resin. Accurel resin becomes partially wet with amine oxide. It is then attached to a rotary evaporator equipped with an aspirator (~15–40 mm pressure), which is turned on slowly thus maintaining the temperature of the water-bath at 45–55 C. The sticky mass becomes clear and polymer becomes free flowing in nature when tumbled for about 1 hour period. Drying is continued for 3 hours with continuous tumbling to isolate 50.2 g free flowing Accurel MP resin imbibed with N,N-didecyl-N-methylamine oxide (for a 50% loading of additive).

Example B

The process of example A is repeated, except with 35.0 g of Hydrated N,N-Didecyl-N-methylamine oxide liquid form, for incorporation into 22.5 g of Accurel MP resin. After drying, 55.53 g free flowing Accurel MP 100 resin imbibed with N,N-didecyl-N-methylamine oxide (60% loading of additive) is isolated.

Example C

To 50.0 g. of N,N-didecyl-N-methylamine placed in a 500 mL round bottom flask fitted with a water condenser, is added 50.0 g isopropylalcohol, and 0.3 g. of ethylene diamine tetraacetic acid (EDTA). The solution is heated slowly to about 50° C. in a oil-bath using magnetic stir-bar. While maintaining the reaction temperature at about 50–55° C., 12.57 g of 50% solution of hydrogen peroxide is added using addition flask for a period of one hour. After the complete addition of hydrogen peroxide, the reaction mixture is heated to 80–85° C. and held for 24 hours. Reaction completion is monitored by the consumption of hydrogen peroxide. 50.0 g of Accurel MP 100 is weighed into a 1000 mL. round bottom flask, and the N,N-didecyl-N-methylamine oxide containing isopropylalcohol and water is transferred in to the flask. The procedures of Example B are repeated with the product being dried for hours to isolate 102.88 g of Accurel MP 100 imbibed with N,N-didecyl-N-methylamine oxide (for 50% loading level). The product is free-flowing and non-sticky in nature.

Example D

Following the procedure described above in Example C, 50.0 g N,N-dicoco-N-methylamine is oxidized in 50.0 g of isopropyl alcohol containing 0.3 g of EDTA using 9.89 g of 50% hydrogen peroxide. This is imbibed onto 50.0 g of Accurel MP 100 resin to isolate 100.95 g of free flowing Accurel MP 100 resin imbibed with N,N-Dicoco-N-methylamine oxide (50% loading). The product is also found to be free-flowing and non-sticky in nature.

Example E

Example A is repeated, except with 20.0 g of 2,4,6-tri-tert-butylphenyl-(2-butyl-2-ethyl-1,3-propanediol) phosphite and 20.0 g of Accurel MP 100, for an isolated 40.08 g of product which is homogeneous, free flowing and non-sticky in nature.

Example F

Following the procedure described above, 50.0 g of Weston® 399, a phosphite product commercially available from GE Specialty Chemicals, Inc. ("GESC"), is imbibed on 50.0 g of Accurel MP 100 resin at 75–85 C for 2 hours. The isolated product (100.04 g in quantity) is free flowing and non-sticky in nature.

Examples 1–13 (Table 1, 2 and 3)

A base formulation is prepared, comprising 100 parts of unstabilized polypropylene (Profax 6301, Montell) with 0.050 parts of calcium stearate. In the examples, the test stabilizers as prepared above as well as additives/stablilizers in the pure liquid, powder, or semi-solid form, are blended/mixed with the resin using a Turbula blender for 30 minutes. The amine oxide (in powder form) is available from GESC under the trade name GENOX™ EP. The liquid additive is hydrated N,N-didecyl-N-methyalamine oxide. The semi-solid additive is also N,N-didecyl-N-methyalamine oxide. Accurel 0%, 50%, 60% loading means 0%, 50%, 60% of N,N-didecyl-N-methyalamine oxide has been loaded on the Accurel as described earlier.

The blended stabilized resin formulations are next extruded at 100 rpm from 1 inch (2.5 cm) diameter extruder at 500° F. (260° C.) using a Killion extruder.

After each of the first, third and fifth extrusions, resin pellets are compression molded into 125 mil (3.2 mm) thick plaques at 370° F. (188° C.). Yellowness index (YI) is measured for each specimen according to ASTM 1925. Low YI values indicate less yellowing (better color stabililty). Additionally, the melt flow rate (MFR—in grams/10 minutes) is also measured per ASTM-D-1238 on the pellets after the first, third and fifth extrusions. The closer (the lower) the melt flow rate after the fifth extrusion is to the melt flow rate after the first extrusion indicates the superior process stabilization of polypropylene.

An evaluation of the specimen are presented in the tables below.

| Example | Added Stabilizer | Wt. parts | MFR (g/10 mm) 1st Pass | MFR (g/10 mm) 3rd Pass | MFR (g/10 mm) 5th Pass | Yellowness Index 1st Pass | Yellowness Index 3rd Pass | Yellowness Index 5th Pass |
|---|---|---|---|---|---|---|---|---|
| | | | Table 1 | | | | | |
| 1 | powder amine oxide | 0.05 | 15.39 | 18.47 | 22.01 | 2.53 | 2.87 | 3.56 |
| 2 | liquid amine oxide | 0.05 | 15.54 | 17.16 | 22.33 | 2.73 | 3.47 | 4.04 |
| 3 | semi-solid AO | 0.05 | 14.78 | 17.54 | 22.82 | 2.80 | 3.84 | 4.41 |
| 4 | Accurel 50% loading | 0.10 | 14.89 | 17.00 | 20.94 | 2.41 | 3.09 | 3.74 |
| 5 | Accurel 60% loading | 0.083 | 14.53 | 17.40 | 20.17 | 2.56 | 3.16 | 3.95 |
| | | | Table 2 | | | | | |
| 6 | powder amine oxide | 0.05 | 14.22 | 18.72 | 22.08 | 3.42 | 3.96 | 4.14 |
| 7 | semi-solid AO | 0.05 | 15.16 | 19.20 | 22.92 | 2.71 | 3.54 | 3.96 |
| 8 | Accurel 50% loading | 0.10 | 15.08 | 17.56 | 20.20 | 3.25 | 4.20 | 4.71 |
| | | | Table 3 | | | | | |
| 9 | NONE | 0 | 21.57 | 33.01 | 49.82 | 15.19 | 14.29 | 14.13 |
| 10 | semi-solid AO | 0.04 | 15.76 | 16.35 | 18.78 | 2.26 | 3.41 | 4.40 |
| 11 | Accurel 0% loading | 0 | 17.72 | 23.24 | 39.78 | 3.51 | 4.57 | 5.92 |
| 12 | Accurel 50% loading | 0.08 | 13.47 | 15.22 | 18.09 | 3.14 | 4.08 | 4.88 |
| 13 | Accurel 0% loading semi-solid AO | 0.04 0.04 | 14.93 | 16.11 | 18.92 | 2.72 | 3.81 | 4.96 |

As shown in the table, the synergestic effect of the additive compositions of the present invention in polymer meltflow properties is unexpected and surprising. In Examples 4 and 5, the presence of Accurel resin and amine oxide give better melt flow properties compared to Comparable Examples 2 and 3 on equal loading level of additive. Furthermore, it should be noted that with the presence of both Accurel and semi-solid AO as in Examples 12 and 13, the melt flow properties are significantly better than in Example 10 in $1^{st}$ to $3^{rd}$ passes (wherein Accurel is not present).

Examples 14–17

The procedures of examples 1–13 are duplicated, except with a powder triphosphite for Comparable Example 14 and a liquid triphosphite for Comparable Example 15. In Examples 16 and 17, Accurel loaded with 50% phosphite (from Examples E and F) illustrating the present invention is used. The results are as expected and as observed in Examples 1–13, with the additives of the present invention in Examples 16 and 17 showing synergistic and unexpected desirable effects (better YI and MFR) of combining/imbibing additives into microparticles and using such imbibed microparticles as additives as compared to the phosphites of the prior art.

The invention claims is:
1. A polymeric microporous particle for improving melt stability and color stability of thermoplastic composition, wherein said polymeric microporous particle is selected from the group consisting of polypropylene, polyesters, polyamides, polyanhydrides and polyacrylates, a stabilizer is selected from the group consisting of a) an amine oxide and b) an organic phosphite, said microporous particle having a plurality of preformed pores into which said stabilizer is loaded and from which stabilizer is released to said thermoplastic composition in processing.

2. The polymeric microporous particle of claim 1, wherein said particle is used in a masterbatch composition.

3. The polymeric microporous particle of claim 1, wherein said stabilizer is present in an amount of 5 to 85 percent by weight of the total weight of said microporous particle.

4. A polymeric microporous particle for improving melt stability and color stability of thermoplastic composition, wherein said polymeric microporous particle is selected from the group consisting of polypropylene, polyesters, polyamides, polyanhydrides and polyacrylates, a stabilizer selected from the group consisting of a hydrocarbon amine oxide and a hydroxylamine, said microporous particle having a plurality of preformed pores into which said stabilizer is loaded and from which stabilizer is released to said thermoplastic composition in processing.

5. The polymeric microporous particle of claim 1, wherein said microparticle comprises pores in the form of interconnected void spaces, with void volumes ranging from about 20 to 90% to total volume of said microporous particle.

6. The polymeric microporous particle of claim 1, wherein said microporous particle ranges in size from about 5 to 1000 microns in diameter.

7. The polymeric microporous particle of claim 1, wherein said microporous particle comprises a polypropylene.

8. The polymeric microporous particle of claim 1, wherein said microporous particle has a loading capacity of 85 percent by weight.

9. The polymeric microporous particle of claim 1, for use in improving melt stability and color stability of thermoplastic compositions comprising at least one of polyolefins, styrenic polymers, ABS, polyesters, and blends thereof.

10. The polymeric microporous particle of claim 9, for use in improving melt stability and color stability of polyolefin compositions.

11. A composition for improving melt stability and color stability of thermoplastic composition, said composition comprising: a stabilizer selected from the group consisting of a) an amine oxide and b) an organic phosphite; polymeric microporous particles selected from the group consisting of polypropylene, polyesters, polyamides, polyanhydrides and polyacrylates; wherein said microporous particles comprising a plurality of preformed pores into which said stabilizer is loaded and from which stabilizer is released to said thermoplastic composition in processing; and said stabilizer being present in an amount of 5 to 85 percent by weight of the total weight of said microporous particle.

12. The composition of claim 11, wherein said composition is used as a masterbatch.

13. The composition of claim 11, wherein said microporous particles comprise pores in the form of interconnected void spaces, with void volumes ranging from about 20 to 90% to total volume of said microporous particles.

14. The composition of claim 11, wherein said microporous particles range in size from about 5 to 1000 microns in diameter.

15. The composition of claim 11, wherein said microporous particles comprise a polypropylene.

16. The composition of claim 11, further comprising at least one additive selected from the group consisting of phenolic antioxidants, 3-arylbenzofuranones, hindered amine light stabilizers, ultraviolet light absorbers, alkaline metal salts of fatty acids, and hydroxylamines.

17. The composition of claim 16, further comprising at least an additive selected from the group consisting of alkaline metal salts of fatty acids.

18. A microparticle for stabilizing thermoplastic compositions, having an average diameter of 2–200 µm, said microparticle comprising a stabilizer selected from the group consisting of amine oxides and organic phosphites, said stabilizer being dispersed in a matrix composed of interconnected pores having a void volume ranging from about 20 to 90%, and wherein said pores having a median size of about 0.10 micrometers to about 10 micrometers.

* * * * *